March 26, 1963 J. NOURY 3,083,101

REFILL FOR FILTRATION COFFEE-POT

Filed April 6, 1960

INVENTOR.
JEAN NOURY

BY

ATTORNEYS

United States Patent Office 3,083,101
Patented Mar. 26, 1963

3,083,101
REFILL FOR FILTRATION COFFEE-POT
Jean Noury, 10 Rue Oberkampf, Paris, France
Filed Apr. 6, 1960, Ser. No. 20,435
Claims priority, application France Apr. 6, 1959
3 Claims. (Cl. 99—77.1)

The present invention relates to filtration coffee-pots and like apparatus, that is, coffee-making pots and percolators wherein the coffee is prepared by causing hot or boiling water, or water vapor, to percolate through a certain quantity of ground coffee.

Certain known coffee-pots of this general character consist simply of a pouring pot or container adapted to support a cylindrical receiver having a perforated bottom and enclosing a detachable sieve to be placed above the ground coffee disposed in turn on the perforated bottom of the receiver. In coffee-pots of this general type it is sufficient to pour hot water into this detachable receiver, the water flowing thereafter by gravity through the coffee. This invention is also concerned with detachable receivers of the same type but of smaller size which are commonly called "individual filters or percolators," adapted to be placed directly upon a cup for making coffee therein.

Other coffee-pots and similar devices are known which consist of a container comprising an intermediate compartment adapted to receive the ground coffee, the water being contained in an upper portion of this container and boiled to cause water vapor under pressure to pass through the ground coffee. In other devices of the same general type but intended more particularly for making relatively large quantities of coffee, notably in cafés, public-houses, bars, hotels and restaurants, some mechanical means are provided for causing the hot water or steam under pressure to flow through the ground coffee.

These different types of coffee-pots and apparatus give good results but their use or operation is attended by a number of drawbacks.

Thus, a first drawback lies in the fact that the filter or the compartment receiving the ground coffee, as well as the different detachable components contacting the ground coffee, require a thorough cleaning after each coffee-making operation. Now it is well known that this cleaning step is frequently awkward.

Another inconvenience resides in the fact that it is extremely difficult for the operator to put exactly the required quantity of ground coffee into the filter, percolator or corresponding compartment. As a result, the quality of the beverage may vary considerably. On the other hand, if the operator introduces an excess of ground coffee into the filter or compartment, when this coffee becomes impregnated with water it cannot expand freely and is compressed to form a kind of plug through which the water can flow only at an abnormally slow rate. This inconvenience may also result from excessive preliminary ramming of the ground coffee by the operator, this ramming compacting the coffee and retarding the flow of water therethrough so as to increase in proportion the time necessary for preparing the beverage.

It is therefore the essential object of this invention to avoid the various drawbacks set forth hereinabove while facilitating the use of different types of coffee-pots and coffee percolators operating by hot-water or water-vapor, filtration whether by simple gravity or under pressure. It is another object of this invention to free the use of coffee-pots of the type set forth hereinabove from limitations such as the necessity of completely cleaning the filter or coffee-receiving compartment after each coffee-making operation. It is also within the scope of this invention to permit the use of exactly the requisite or metered quantity of coffee without ramming or measuring same.

To this end, this invention provides an accessory for coffee-pots or coffee-percolators of the type set forth, which consists of a closed refill cartridge adapted to be placed as such into a filter of a coffee-pot or in the corresponding compartment of a coffee-making percolator or like apparatus, this cartridge having perforated top and bottom walls and containing the adequate quantity of ground or soluble coffee, and being provided, before its actual use, with separable sealing means to prevent the aroma of the coffee from being prematurely dissipated.

According to a preferred form of embodiment of the present invention this cartridge contains a perforated wall of relatively moderate thickness which is kept parallel to and closely spaced from its upper or lower face in order to form between this face and said wall an expansion chamber permitting the free expansion or swelling of the ground coffee as the water percolates therethrough, the thin internal partition being thus free to bulge into this expansion chamber.

With the foregoing and other objects in view, the invention resides in the novel arrangements and combinations of parts and in the details of construction hereinafter described and claimed, it being understood that changes in the precise embodiments of the invention herein disclosed may be made within the scope of what is claimed without departing from the spirit of the invention.

Other objects and advantages will become apparent from the following description taken in conjunction with the accompanying drawing, in which.

Figure 1:
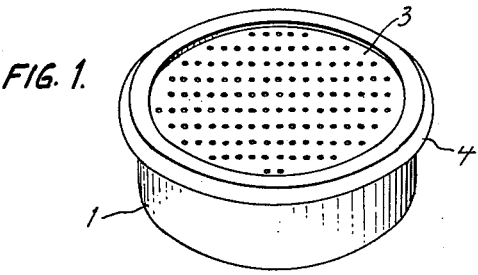
FIGURE 1 is a perspective view showing a ground coffee refill cartridge according to this invention.
Figure 2:
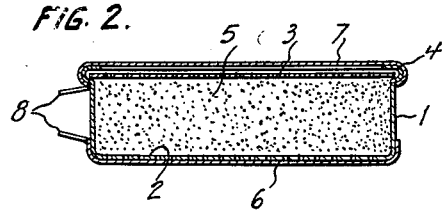
FIGURE 2 is an axial section of the device shown in FIG. 1.

The cartridge illustrated in FIGS. 1 and 2 of the drawing consists of a case, box or body 1 of substantially cylindrical configuration having a bottom 2 formed with small perforations, that is, holes of a diameter small enough to permit the passage only of the liquid coffee with the minimum quantity of coffee-grounds while retaining the greater part of the ground coffee proper; the number of these perforations being sufficient to permit the flow of liquid at a normal rate. The case 1 is closed by an annular cover 3 formed with perforations similar to those of the bottom 2.

This cover is secured on the case body 1 for example by having its peripheral edges 4 crimped thereon. However, this fixation is accomplished only after a predetermined and suitable amount of ground or soluble coffee 5 has been introduced into the case. This amount of coffee corresponds to the quantity required for preparing the desired number of cups of coffee. Thus, cartridges of different sizes are provided which enclose each a different, metered quantity of ground or soluble coffee which corresponds for example to one, two, three or more cups of coffee.

The case 1 and cover 3 may consist of tin or sheet metal, but an adequate plastic material selected to prevent same from altering the taste of coffee may be used, if desired. Preferably, the walls of the case 1 and cover 3 are thin enough to have a certain flexibility whereby they may be deformed and allowed to bulge under the influence of the pressure exerted by the ground coffee 5 when the latter is soaked with water and swollen. Thus, the ground coffee may expand freely and will be prevented from being unduly compressed when impregnated with water, as this would prevent or at least retard the passage of water therethrough.

Before use, the perforations in the bottom 2 and cover 3 are closed by a detachable cover adapted to be removed before inserting the cartridge into a coffee-pot or like apparatus. In the example illustrated in FIG. 2 these perforations are closed by a pair of sheets 6, 7 of impervious material, which have their inner faces coated with adhesive substance at least on their peripheral portions, these two sheets being thus glued on the registering faces of the cartridge or at least on the edges thereof, and adapted to be pulled or torn off without difficulty. A gripping lug 8 may be provided to facilitate this removal. Thus, the aroma of the ground coffee will not dissipate before using the cartridge, that is, from the time this cartridge is filled in a coffee-roasting shop to the time when it is used by a housewife or an operator in a café, bar restaurant or public house. Thus, this cartridge may be stocked without inconvenience as long as necessary by wholesalers, shop-keepers and housewives, and be forwarded or shipped in this form.

Figure 3:
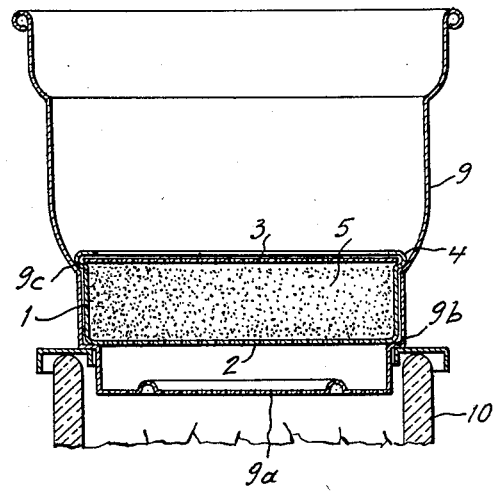
FIGURE 3 is an axial sectional view showing a filter in which a coffee-making cartridge is placed.

To prepare coffee by means of this cartridge it is sufficient to remove the detachable covers or the impervious sheets 6, 7 and to place the cartridge into the filter of a coffee-pot, or in the compartment provided to this end in a coffee-making apparatus. Thus, FIG. 3 shows the use of a cartridge 1 in an individual percolator 9 of conventional type which is placed onto a cup 10. When in position the cartridge bears with its upper edge 4 on the portion 9c of the filter body, this edge forming a bead projecting from the outer wall. Thus, this bead will prevent the water poured into the receiver from flowing around the cartridge, that is, outside the cartridge containing the ground coffee. The bottom of the cartridge may thus rest upon the shoulder 9b. Thus, the user has simply to pour the hot or boiling water into the receiver 9 for making the coffee since the ground coffee 5 is retained between the bottom 2 of the cartridge and the cover 3. As already set forth hereinabove, the water flows at the desired rate since the moderate thickness of the cartridge wall permits the proper expansion of the ground coffee when the latter is soaked with water.

When the proper quantity of water has passed through the cartridge the user may remove the cartridge 1 and simply throw it way. Under these conditions, it is a simple matter to clean the percolator 9 since its inner walls and notably the perforated bottom 9a did not contact at any time the ground coffee.

Of course, the same applies to filtration coffee-pots of the gravity type, or to pressure-operated filtration coffee-pots, or pressure-operated coffee-making apparatus comprising a mechanical or other device. In either case it is sufficient to place the cartridge 1 containing the proper quantity of ground coffee into the filter or coffee-compartment of the coffee-making apparatus or device. Then, when the beverage is ready, the user may simply throw away the cartridge.

As will be readily understood, the refill cartridge according to this invention is characterized by extremely advantageous features, not only with respect to the simplification regarding the cleaning of coffee-pots and coffee-making apparatus but also in connection with the metering of the proper quantity of ground coffee and the facility of allowing the liquid to flow therethrough under the desired conditions.

Figure 4:
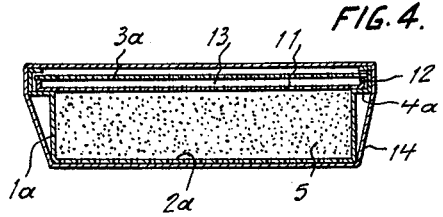
FIGURE 4 is an axial section showing a modified embodiment of the coffee-cartridge according to this invention.

FIGURE 4 illustrates a modified embodiment of the cartridge of this invention, wherein the cartridge consists of a body or case 1a provided with a perforated bottom 2a similar to the bottom 2 of the preceding embodiment. However, this modified cartridge comprises a perforated partition 11 parallel to and closely spaced from its perforated cover 3a, this partition 11 overlying the metered quantity of ground coffee 5. To this end, the edges 4a of the body 1a constitute a peripheral flange engaged by the edge of the aforesaid partition 11. The edge of this partition 11 is raised to form a kind of collar 12 engaged by the edge of the cover 3a which is secured by crimping. Thus, this collar 12 constitutes a distance-piece maintaining a predetermined relative spacing between the partition 11 and the cover 3a. With this arrangement a free space 13 is left between these elements which is adapted to act as an expansion chamber, the partition 11 being thin enough to have a certain inherent flexibility and permit its deformation and bulging under the influence of the pressure exerted by the ground coffee 5 when the latter is swollen by being soaked with water.

Thus, in this alternate embodiment the body 1a and cover 3a may be thicker than in the preceding form of embodiment, for they need not be flexible themselves. When the ground coffee expands, it is the partition 11 that bulges within the expansion chamber 13, thus permitting the free expansion of the ground coffee.

As shown in FIGURE 4, the cartridge 1a is enclosed in a wrapper 14 of flexible, impervious material. This wrapper will somewhat close the perforations of the cartridge and prevent the aroma of the ground coffee from dissipating before its actual use. Of course, this wrapper should be removed by tearing before utilizing the cartridge.

It is also to be understood that the object of this invention is not limited to the two forms of embodiment shown and described herein as any desired modifications may be brought thereto, notably in accordance with the specific applications contemplated, without departing from the spirit and scope of the invention. Thus, in the example illustrated, the cartridge or refill filled with ground coffee is generally of substantially cylindrical configuration, but it is evident that any other shapes may be resorted to; thus, polygonal or square shapes corresponding to the internal form of the percolator or coffee-receiving compartment of the coffee-pot or coffee-making machine or apparatus receiving this cartridge, may be used. This refill cartridge may also be provided on its walls with members or projections for facilitating its positioning and or if desired, its removal. It may also be provided with a sealing gasket or any other adequate member adapted to prevent the water or steam from flowing around this cartridge, this gasket or other member co-acting to this end with the walls of the compartment receiving the cartridge.

What I claim as new is:

1. For use in a coffee-making receiver, a refill cartridge comprising a substantially cylindrical closed case made from relatively thin material and adapted to be supported by a water receiver, said case having perforated top and bottom walls, a flexible and deformable additional internal perforated partition parallel to said walls and in fixed position relative to said walls, the thinness of said partition being such that it bulges under the pressure of expanding coffee when contacted by water, nearer to one wall than to the other, so as to subdivide the inner space of said case into a larger chamber and a smaller chamber, a metered quantity of ground coffee in said larger chamber completely filling said larger chamber, an internal shoulder on said casing contacted by said partition, said smaller chamber being completely empty and constituting an expansion chamber permitting the free deformation of said additional internal partition and the free expansion of the ground coffee in said case when heat and moisture have been directed through said refill cartridge.

2. A refill cartridge according to claim 1 comprising detachable sealing means in the form of a pair of sheets of impervious material which are coated with an adhesive substance and adapted to adhere on the outer faces of said perforated top and bottom walls for closing their perforations and thus prevent the aroma of the coffee from being dissipated prior to its actual use, said sheets having gripping lugs extending from the periphery thereof.

3. A refill cartridge according to claim 1 comprising an upstanding collar around the periphery of said partition, said top wall engaging the upper edge of said collar, a peripheral flange projecting inwardly from the top of said case and engaging said top wall.

References Cited in the file of this patent

UNITED STATES PATENTS

| | | |
|---|---|---|
| 1,412,388 | Clermont | Apr. 11, 1922 |
| 1,499,281 | Altieri | June 24, 1924 |
| 1,576,735 | Fessenden | Mar. 16, 1926 |
| 2,292,101 | Brown | Aug. 4, 1942 |
| 2,936,695 | Donot | May 17, 1960 |
| 2,968,560 | Goros | Jan. 17, 1961 |